United States Patent
Guven Kaya et al.

(10) Patent No.: US 11,568,242 B2
(45) Date of Patent: Jan. 31, 2023

(54) OPTIMIZATION FRAMEWORK FOR REAL-TIME RENDERING OF MEDIA USING MACHINE LEARNING TECHNIQUES

(71) Applicant: International Business Machines Corporation, Armonk, NY (US)

(72) Inventors: Sinem Guven Kaya, New York, NY (US); Noah Zheutlin, Pound Ridge, NY (US); Rohan R. Arora, Danbury, CT (US); Gerard Randolph Vanloo, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 16/704,044

(22) Filed: Dec. 5, 2019

(65) Prior Publication Data

US 2021/0174189 A1 Jun. 10, 2021

(51) Int. Cl.
*G06N 3/08* (2006.01)
*G06F 9/54* (2006.01)
*G06N 3/04* (2006.01)

(52) U.S. Cl.
CPC .............. *G06N 3/08* (2013.01); *G06F 9/542* (2013.01); *G06N 3/04* (2013.01)

(58) Field of Classification Search
CPC .......... G06N 3/04; G06N 3/0454; G06N 3/08; G06F 11/34; G06F 11/3409;
(Continued)

(56) References Cited

U.S. PATENT DOCUMENTS 9,031,971 B2 5/2015 Narayanan
9,448,404 B2 9/2016 Pandey et al.
(Continued)

FOREIGN PATENT DOCUMENTS

EP 3109689 12/2016
EP 3771215 A1 * 1/2021 ......... G01C 21/3697
GB 2566013 3/2019

OTHER PUBLICATIONS

Rudenko, Alexey, et al., Saving portable computer battery power through remote process execution, ACM SIGMOBILE Mobile Computing and Communications Review, vol. 2, Issue 1, Jan. 1998, pp. 19-26, [retrieved on Nov. 5, 2022], Retrieved from the Internet: <URL:http://dl.acm.org/>.*

(Continued)

*Primary Examiner* — Geoffrey R St Leger
(74) *Attorney, Agent, or Firm* — Liberman & Brandsdorfer, LLC

(57) ABSTRACT

Embodiments relate to an intelligent computer platform to multi-dimensionally optimize device operation. Static hardware device data are acquired and dynamic hardware characteristic data are tracked over one or more temporal segments. A neural model (NM) is trained with corresponding device and network data. The acquired static and dynamic data are input into the NM, and locale processing patterns corresponding to the inputted data are identified. One or more data points and corresponding measurements of the tracked dynamic hardware characteristic data are temporally analyzed. A processing locale corresponding to the temporal analysis is identified and returned as output data, and one or more encoded actions in compliance with the identified processing locale are selectively implemented.

12 Claims, 11 Drawing Sheets

(58) Field of Classification Search
CPC ............ G06F 11/3419; G06F 11/3423; G06F 11/3447; G06F 11/3452; G06F 11/3457; G06F 11/3466; G06F 9/542; G06F 9/547
USPC .......................................................... 706/20
See application file for complete search history.

(56) References Cited

U.S. PATENT DOCUMENTS

| | | | |
|---|---|---|---|
| 2017/0255259 A1 | 9/2017 | Mor | |
| 2020/0013371 A1* | 1/2020 | Yang | G09G 5/00 |
| 2020/0134497 A1* | 4/2020 | Salomon | G06F 16/9024 |
| 2020/0409457 A1* | 12/2020 | Terrano | G06F 3/012 |

OTHER PUBLICATIONS

Imai, Shigeru, et al., Light-Weight Adaptive TaskOffloadingfrom Smartphones to Nearby Computational Resources, RACS '11: Proceedings of the 2011 ACM Symposium on Research in Applied Computation, Nov. 2011, pp. 146-152, [retrieved on Nov. 5, 2022], Retrieved from the Internet: <URL:http://dl.acm.org/>.*

Srinivasan, S., et al., "Performance Characterization and Optimization of Mobile Augmented Reality on Handheld Platforms", 2009 IEEE International Symposium on Workload Characterization (IISWC), pp. 128-137, 2009.

Al-Shuwaili, A., et al., "Energy-Efficient Resource Allocaiton for Mobile Edge Computing-Based Augmented Reality Applications", IEEE Wireless Communications Letters, vol. 6, No. 3, Jun. 2017.

Wagner, D., et al., "Making Augmented Reality Practical on Mobile Phones, Part 2", IEEE Computer Graphics and Applications, vol. 29, No. 4, Jul.-Aug. 2009.

Jain, P., et al., "Overiay: Practical Mobile Augmented Reality", Proceedings of the 13th Annual International Conference on Mobile Systems, Applications and Services (MobiSys' 15), ACM, pp. 331-344, 2015.

Petrangeli, S., et al., "Dynamic Video Bitrate Adaptation for WebRTC-Based Remote Teaching Applications", Proceedings of IEEE NOMS '18, Taipei, Taiwan, 2018.

Merkle, P., et al., "Stereo Video Encoder Optimization for Mobile Applications", Proceedings 3dTV'11, Antalya, Turkey, 2011.

Zhang, W., et al., "Jaguar: Low Latency Mobile Augmented Reality with Flexible Tracking" ACM Multimedia Conference, pp. 355-363, Oct. 2018.

Chen, K., et al., "MARVEL: Enabling Mobile Augmented Reality with Low Energy and Low Latency", Proceedings of ACM Conference Embedded Network Sensor System, ACM 2018.

* cited by examiner

OPTIMIZATION FRAMEWORK FOR REAL-TIME RENDERING OF MEDIA USING MACHINE LEARNING TECHNIQUES

BACKGROUND

The present embodiments relate to an artificial intelligence platform and an optimization methodology for enabling real-time rendering of augmented reality and virtual reality data. More specifically, the embodiments relate to employing cognitive computing and machine learning to analyze static and dynamic data points and corresponding measurements, and selection of an optimization mode for rendering data responsive to the analysis.

Machine learning, which is a subset of Artificial Intelligence (AI), utilizes algorithms to learn from and create foresights based on this data. AI refers to the intelligence when machines based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures, such as databases, are inherently subject to change, and the output or action may be subject to change accordingly. Solutions for efficiently understanding and processing content in response to the identification and understanding, as well as changes to the structures, are extremely difficult at a practical level.

SUMMARY

The embodiments include a system, computer program product, and method for multi-dimensional device operation optimization.

In one aspect, a computer system is provided with a processing unit and memory for use with an artificial intelligence (AI) computer platform for device operation optimization. The processing unit is operatively coupled to the memory and is in communication with the AI platform and embedded tools, which include a device manager, a data manager, and an analyzer. The device manager functions to acquire static hardware device data and track dynamic hardware characteristic data over one or more temporal segments. The data manager trains a neural model (NM) with corresponding device and network data. The data manager further inputs the acquired static and dynamic data into the NM, and identifies locale processing patterns corresponding to the inputted data. The analyzer temporally analyzes one or more data points and corresponding measurements of the tracked hardware characteristic data. The data manager identifies a processing locale corresponding to the temporal analysis and returns the identified processing locale as output data. The device manager selectively implements one or more encoded actions in compliance with the identified processing locale.

In another aspect, a computer program device is provided to optimize device operation. The program code is executable by a processing unit for multi-dimensional device operation optimization. The program code is executable by the processing unit to acquire static hardware device data and tracks dynamic hardware characteristic data over one or more temporal segments. The program code is executable by the processing unit to train a neural model (NM) with corresponding device and network data. The program code is executable by the processing unit to input the acquired static and dynamic data into the NM, and identify locale processing patterns corresponding to the inputted data. The program code is executable by the processing unit to temporally analyze one or more data points and corresponding measurements of the tracked hardware characteristic data. A processing locale corresponding to the temporal analysis is identified and returned as output data. Program is executable by the processing unit to code selectively implement one or more encoded actions in compliance with the identified processing locale.

In yet another aspect, a method is provided for device operation optimization. Static hardware device data is acquired and dynamic hardware characteristic data is tracked over one or more temporal segments. A neural model (NM) is trained with corresponding device and network data. The acquired static and dynamic data is input into the NM, and locale processing patterns corresponding to the inputted data are identified. One or more data points and corresponding measurements of the tracked dynamic hardware characteristic data are temporally analyzed. A processing locale corresponding to the temporal analysis is identified and returned as output data, and one or more encoded actions in compliance with the identified processing locale are selectively implemented.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
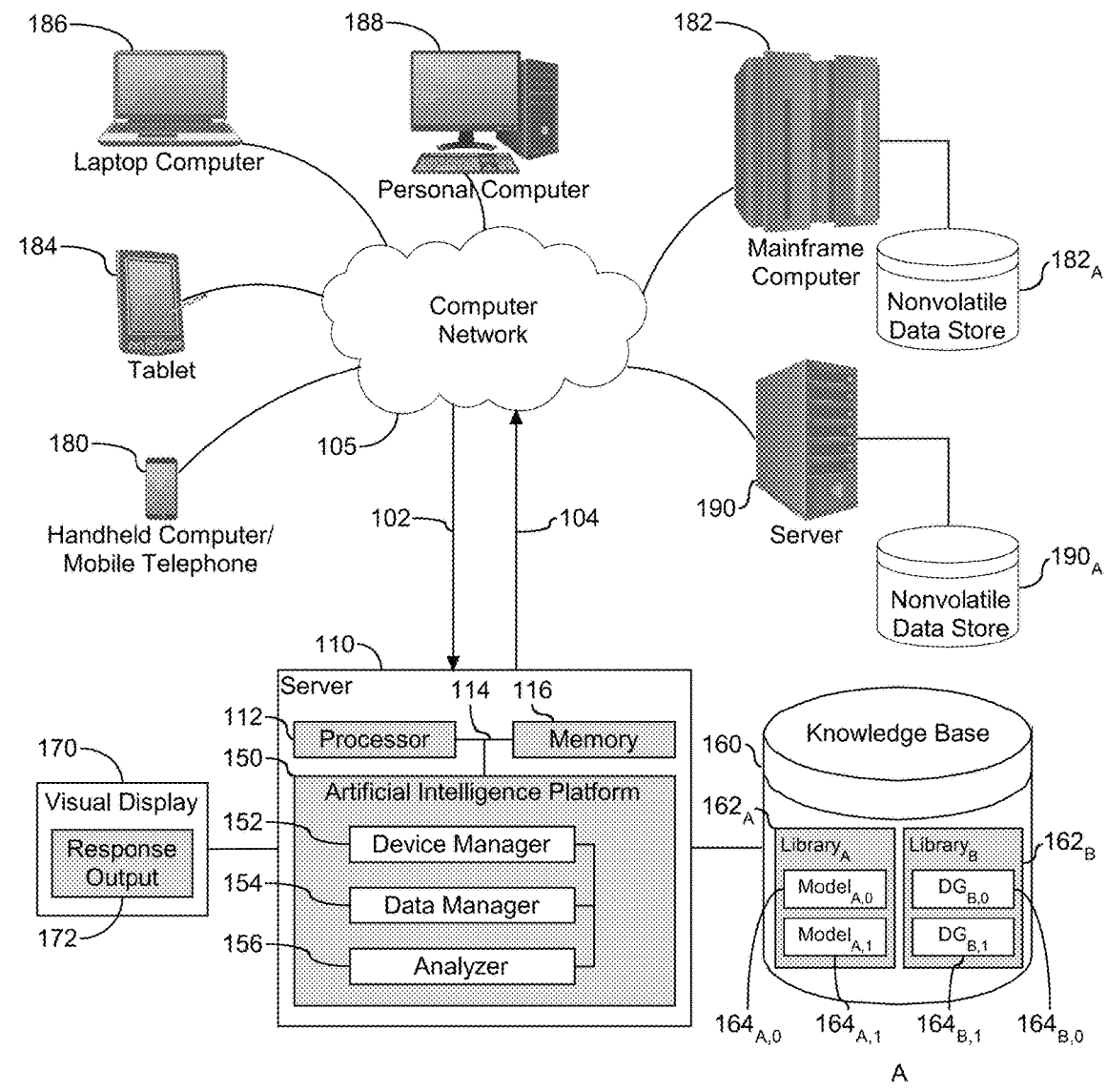
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Augmented reality (AR) is understood in the art as integration of digital information with the user's environment in real-time. More specifically, AR is a type of interactive, reality-based display environments that takes capabilities of computer generated display, sounds, text, and effects to enhance a user's real-world experience. AR combines real and computer-based scenes and images to deliver a unified and enhanced view. In comparison to virtual reality (VR), which creates an artificial environment, AR uses an existing environment and overlays new information on top of the existing environment. An example scenario is a technician with limited experience working at a remote location on a machine they are not familiar with, or in one embodiment, where the technician encounters a problem that they have not encountered before. AR is an emerging technology being implemented to support field technicians at remote location, wherein AR provides the field technicians with in-situ visual instructions with appropriate context, while removing a cognitive burden of having to relate an instruction. Accordingly, AR mitigates, and in one embodiment eliminates ambiguity, reduces error, and increases efficiency with repair processes via visual guidance.

However, it is understood in the art that there are challenges associated with applying AR and VR technology for remote support. It is understood that there are constraints directed at use of real-time collaborative mobile AR applications. Such constraints may be hardware, software or network related, or in one embodiment a combination of all three constraints or a selection of two of the constraints. Examples of constraints may be found in a corresponding internet data plan with respect to speed and data allowance. Other constraint examples include limitations of battery life, central processing unit (CPU) and graphics processing unit (GPU) capabilities and limitations, etc. It is understood that AR applications require significant CPU, GPU and battery usage that leads to device heating, which requires management to prevent over-heating or device damage. As shown and described herein, a framework is provided to optimize various aspects of a real-time AR system that is responsive to both static and dynamic hardware and network characteristic data.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. Machine learning (ML), which is a subset of AI, utilizes algorithms to learn from data and create foresights based on this data. More specifically, ML is the application of AI through creation of neural networks, also referred to herein as neural models that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

As shown and described herein, a system, a method, and a computer program product are provided and directed at using AI to drive optimization decisions of a remote computing device to support AR, and in one embodiment VR, applications. The remote computing device is configured to communicate across a distributed network through a network connection. It is understood that select characteristics of the remote computing device have corresponding data, which may be static data or dynamic data. Static data is directed at data or data values that are not subject to change. In contrast, dynamic data is directed at data or data values that are subject to change or update. Characteristics of the computing device, as articulated by corresponding static and dynamic data points are leveraged to create an optimized output to support remote communication. The optimization is directed at supporting and driving dynamic optimization decisions corresponding to AR and VR applications.

It is understood that hardware devices, and in this example, mobile computing devices, e.g. smartphones and tablets, have static data, e.g. data that is not subject to change or update, and dynamic characteristic data, e.g. data that is subject to change and update. The static data is directly related to the type of device and device components such as the operating system, and in one embodiment a network communication platform. Examples of static data include, but are not limited to, amount of processing power available (e.g., SOC—system on a chip) and data plan limit. The dynamic data may be related directly to the device, and more specifically device hardware, such as battery consumption, device thermal performance, and processing usage, e.g. CPU usage. The dynamic data may also be related to a corresponding communication platform or applications utilized by the device, such as but not limited to, application mode, network connectivity, and data plan usage. Corresponding values of the dynamic data play a role in dynamic optimization decisions.

There are multiple aspects that are utilized in device operation optimization decision. As shown and described herein, the optimizations are separated into processing locale and physical device modification or enhancement, with both aspects directed at creating an optimized output to support remote communications corresponding to AR and VR applications. Referring to FIG. 1, a schematic diagram of an artificial intelligence platform computing system (100) is depicted. As shown, a server (110) is provided in communication with a plurality of computing devices (180), (182), (184), (186), (188), and (190) across a network (105). The server (110) is configured with a processing unit (112) in communication with memory (116) across a bus (114). The server (110) is shown with an artificial intelligence (AI) platform (150) for cognitive computing, including machine learning, over the network (105) from one or more of the computing devices (180), (182), (184), (186), (188), and (190). The computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network (105) communicate via connections (or network connections) (102) and (104) to enable communication detection, recognition, and resolution. Other embodiments of the server (110) may be used with components, systems, sub-systems, and/or devices other than those that are depicted herein.

The AI platform (150) is shown herein configured with tools to employ machine learning techniques and apply machine learning (ML) output to enhance device optimization and communication processing. The tools function to optimized device operation to support and enable AR and VR applications across the network (105) using ML techniques. The tools include, but are not limited to, a device manager (152), a data manager (154), and an analyzer (156). The AI platform (150) may receive input from the network (105) and leverage a data source (160), also referred to herein as a corpus or knowledge base, to selectively access device and network activity data. As shown the data source (160) is configured with a plurality of libraries, including library$_A$ (162$_A$) and library$_B$ (162$_B$). Although only two libraries are shown, this quantity should not be considered limiting. In one embodiment, and as shown herein, library$_A$ (162$_A$) stores and organizes a plurality of neural models, shown herein as model$_{A,0}$ (164$_{A,0}$) and model$_{A,1}$ (164$_{A,1}$). The models are machine learning models (MLMs), also referred to herein as neural models (NMs) that are created and managed by the data manager (154). Details of how the models are utilized are shown and described in detail below. Library$_B$ (162$_B$) stores and organizes a plurality of directed graphs (DGs), shown herein as DG$_{B,0}$ (164$_{B,0}$) and DG$_{B,1}$ (164$_{B,1}$). Details of how the DGs are populated and utilized are shown and described in detail below.

It is understood that different domains, such as different business organizations or departments within the business organization may each be classified as a domain. In one embodiment, each domain may have one or more corresponding NMs and DGs. For example, in one embodiment, the knowledge base (160) may be organized by domain, with each domain functioning as a library populated with one or more NMs and DGs. Libraries may be added to the knowledge base (160), and corresponding device and communication data, also referred to herein as activity data, reflected in one or more corresponding NM(s) and DG(s).

It is understood that machine learning leverages data from one or more data sources. As shown herein, the knowledge base (160) is configured with domains and logically grouped activity data in the form of models and DGs. The device manager (152) functions to acquire data from the various computing devices (180), (182), (184), (186), (188), and (190) in communication with the network (105). The aspect of acquiring data includes collection and extraction. The acquired data includes both static hardware device data and dynamic hardware characteristic data. It is understood in the art that static data is data that does not change after being recorded, e.g. it is a fixed data set. In contrast to static data, dynamic data may change after it is recorded, and in one embodiment has to be continually updated. An example of static device data includes processing power. The computing device is configured with an embedded processor with limited processing characteristics and functionality. Another example of static data with respect to a mobile computing device, e.g. smartphone, is a data plan limit. The data plan is an agreement between a mobile carrier and a customer that specifies how much mobile data the user can access for a defined period of time for a specific fee. In one embodiment, the customer may select a different data plan with different limitations, but regardless each data plan has defined static limitations. Accordingly, both static and dynamic device data are extracted or otherwise obtained by the device manager. It is important to note that some of the device aspects which are considered static, such as processing power, may also have dependency on some dynamic aspects, such as processing power being reduced when there is device heating. The ML model needs to take this into consideration when training and at run-time.

As shown, the data manager (154) is operatively coupled to the device manager (152). The data manager (154) organizes or arranges the collected data from one or more of the computing devices into one or more of the corresponding models. Models may be created for domains, devices, and communication networks. In one embodiment, the models may be based on an intra-domain activity or inter-domain activity. The data manager (154) trains a new or existing model with corresponding device and network data. In one embodiment, the data manager (154) utilizes the data acquired from the device manager (152) as input to the new or existing model. The model processes and organizes the acquired data, including the static and dynamic data, including device and network data. The dynamic data is inherently subject to change, and as changes in the dynamic data are obtained, the data manager processes the changed dynamic data through the corresponding model, and in one embodiment updates the model with the changed dynamic data. Accordingly, the data manager (154) functions to interface between the device manager and the models to process device and network data.

It is understood that data may be collected at periodic intervals, upon completion of a task, or omission of a milestone related to the task, with the device manager (152) collecting the data or changes in the data and the data manager (154) reflecting the collected or changed data in an appropriately classified or operatively coupled model. In one embodiment, the device manager (152) may function in a dynamic manner, including, but not limited to, detecting changes to the collected data, e.g. through comparison of received data to previously received or retained data, and collecting the changed data. Similarly, the data manager (154) utilizes one or more ML algorithm(s) to update a corresponding model to reflect and incorporate the data changes. In one embodiment, the device manager (152) may function in a sleep or hibernate mode when inactive, e.g. not collecting data, and may change to an active mode when collecting or receiving data. A project may be comprised of a single task or multiple tasks. In the case of multiple tasks, one task may be classified as dependent or independent. Similarly, tasks may have corresponding milestones directed at anticipated or required completion or partial completion and an associated or anticipated completion deadline. The device manager (152) may function responsive to the milestones, including collecting data or changing functional states responsive to attainment or non-attainment of the corresponding milestones. Accordingly, the device manager (152) functions as a tool to collect and organize data from one or more computing devices, with the data manager (154) reflecting the organized data into one or more models.

The data manager (154), which is shown herein operatively coupled to the device manager (152), functions as a tool to dynamically assess the acquired static and dynamic data corresponding to the device and the corresponding communication network based on the collected data reflected in the model(s). The data manager (154) evaluates milestone related data, including learning values of device and network states or state histories, and to maximize utility of outcomes. States can involve different states associated with the device and communication network, including, but not limited to, device operating mode, connectivity, battery, device heat, and data plan. The model functions as a tool to assess and process locale, e.g. local or remote processing. A plurality of factors, including device and communication network factors, are utilized by the model for the assessment. The model identifies locale processing patterns, including outliers or deviations that correspond to data populated in the model.

It is understood in the art that local processing is performed in a single location local to the device, and in one embodiment may not require communication network support. Remote processing is understood in the art as being performed in one or more locations physically separate from the requesting device, and require communication network support. The identification of locale processing patterns leverages the device and network communication data to ascertain historical patterns of locale processing in view of device and network limitations. Communication networks are restricted by bandwidth, which is the capacity of a wired or wireless network communications link to transmit data. Bandwidth is described as a data transfer rate. A greater bandwidth correlates with an increased amount of data that can be sent or received. It is understood that as network traffic increases, e.g. an increase in data transmission, the bandwidth decreases. Traffic patterns across the network may be apparent or learned. For example, it is understood that traffic may increase at one set of select hours, e.g. work hours, and decrease at another set of select hours, e.g. non-work hours. As shown herein, the analyzer (156) is operatively coupled to the data manager (154), and functions to identify patterns associated with the network and network characteristics. More specifically, the analyzer (156) temporally, e.g. with respect to select time intervals, analyzes data points and corresponding measurement of the device and network communication data. Accordingly, the analyzer (156) interfaces with the data manager (154) to identify network characteristics and associated patterns based on identified or select temporal intervals.

The model creates output in the form of identification of a processing locale corresponding to the temporal analysis. More specifically, the model processes the device and network communication data and leverages the temporal analysis conducted by the analyzer (156). Output from the model in the form of an encoded action identifies the processing locale. In one embodiment, the processing locale may be selected based on an associated processing request. For example, if the processing request requires minimal processing power at a select time interval with limited network bandwidth, then the output may be directed to local processing. However, it is understood in the art that AR and VR data processing and communication requires network bandwidth and processing power, both of which may not be ideal for local processing. Accordingly, the data manager (154) interfaces with the analyzer (156) to evaluate processing and network characteristics for locale identification and selection.

It is understood that network communication usage is dynamic, and corresponding network communication efficiency correlates to communication usage and the dynamic characteristics. The model outputs data for a select processing locale subject to a defined time interval. However, it is understood that the selection of the locale may vary based on different intervals. In one embodiment, the output data from the model may indicate different options for processing locales based on different time intervals and corresponding network traffic.

The device manager (152) receives and selectively implements one or more encoded actions that correspond to the processing locale identified by the model. In one embodiment, the device manager (152) selects the encoded action based on the time interval. In one embodiment, the device manager (152) may delay processing or sending a processing request to a remote locale for a set period of time. For example, in one embodiment, the encoded actions may include a first action directed at local processing for still image communication at a first time interval, and a second action directed at remote processing for AR data communication at a second time interval. Depending on the first and second time intervals or the data required to be processed as opposed to data wanted by not required, the device manager (152) selectively implements one of the encoded actions that complies with the identified processing locale.

Selection of a processing locale is one aspect, e.g. one dimension, in support of the data processing and communication. Another aspect, e.g. dimension, is directed at the physical communication and processing device, and the physical limitations and optimizations. It is understood in the art that the remote communication device, e.g. smartphone, has settings that can be modified to support the communication processing and transmission. For example, with respect to remote communication, the resolution of the data to be communicated may be modified, an image or video mode may be selected, and the frame per second transmission rate may be adjusted. If the temporal setting correlates with still image transmission, then AR and VR data is not supported, and the device optimization is limited to image data. The device manager (152) identifies any of the device optimizations that correspond to the temporal analysis, and selectively implements the identified device optimizations. In one embodiment, the device manager (152) may identify two or more available optimizations, and may individually select one or more of the optimizations, and assess the device operability with the selected optimization prior to selecting and implementing a second optimization. Accordingly, the device manager (152) is responsible for the selection and implementation of both the processing locale and one or more device optimizations.

As described herein, the AI platform (150) and corresponding tools (152), (154), and (156) are operatively coupled to the knowledge base (160), which includes one or more libraries with one or more models and DGs therein. The analyzer (156) creates and manages the DGs, with the DGs characterizing hardware device characteristic data. More specifically, each DG comprises of nodes and edges, with the nodes populated with the device data, including the static data and the dynamically tracked characteristic data. Each edge connects two nodes. The analyzer (156) assigns a weight to each edge, with the weight quantifying a corresponding characteristic. As it is understood that dynamic data is subject to change, corresponding changes are reflected in the DG. The analyzer (156) updates the DG with the dynamic data, which includes the analyzer (156) updating the populated data in the DG. Examples of such updates include, but are not limited to, creating new nodes, removing existing nodes, creating new edges, and updating the weights of one or more of the edges. The DG is utilized by the device manager (152) to modify device settings and operation. The edges in the DG, and more specifically their weight assignments, correspond to device optimizations. Accordingly, the DG is one of the dimensional components employed in the multi-dimensional analysis to support remote communication and processing.

The data mining and supervised learning conducted by the device manager (152) and data manager (154), respectively, may be conducted offline or as one or more background processes. The data manager (154) functions as a tool to dynamically generate a probability assessment for the data gathered by the device manager (152). The data manager (154) employs a supervised learning algorithm to assess probability of outcomes, such as probability of processing and transmitted requested data in a specified format at a select temporal segment. The analyzer (156) leverages the identified temporal segment to analyze tracked hardware device data and corresponding measurement.

The data manager (154) enables and supports use of machine learning (ML) with respect to optimization of the probability assessment. In one embodiment, a corresponding neural model (NM) encapsulates a corresponding ML algorithm. The NM functions to dynamically learn values of device and network communication characteristic data, including static data points and tracking dynamic data points. In one embodiment, the data manager (154) utilizes the NM to discover and analyze patterns, and corresponding deviations. As static and dynamically tracked data points are detected or gathered, the data manager (154) may dynamically amend a prior probability assessment. The data manager (154) supports elasticity and the complex characteristics of diverse device and network communication characteristics. Accordingly, patterns of activity data are learned over time and used for dynamically orchestrating or amending the probability assessment.

Response output (172) is shown herein presented on an operatively coupled visual display (170) in the form of one or more of the derived actions. A sequence of actions or an amended sequence of actions as related to the task under evaluation is communicated or otherwise transmitted to the processing unit (112) for execution. In one embodiment, the response output (172) is communicated to a corresponding network device operatively coupled to the server (110) or in one embodiment, operatively coupled to one or more of the computing devices (180)-(190) across the network connection (104).

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including input interfaces to receive requests and respond accordingly.

The various computing devices (180)-(190) in communication with the network (105) may include access points for the logically grouped domains and models. Some of the computing devices may include devices for a database storing the corpus of data as the body of information used by the AI platform (150) to generate response output (172) and to communicate the response output to a corresponding network device, such as a visual display (170), operatively coupled to the server (110) or one or more of the computing devices (180)-(190) across network connection (104).

The network (105) may include local network connections and remote connections in various embodiments, such that the artificial intelligence platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150) and the associated tools (152)-(156) leverage the knowledge base (160) to support orchestration of the sequence of actions directed to device and communication optimization, and supervised learning to optimize the sequence of actions directed to device setting modification and locale processing designation. Device processing data received across the network (105) may be processed by a server (110), for example IBM Watson® server, and the corresponding AI platform (150). As shown herein, the AI platform (150) together with the embedded tools (152)-(156) perform an analysis of network activity data and tasks, dynamically conduct or update a probability assessment, as well as generate one or more recommendations and selection of the generated recommendation(s). Accordingly, the function of the tools and corresponding analysis is to embed dynamic supervised learning to optimize device operation.

In some illustrative embodiments, the server (110) may be the IBM Watson® system available from International Business Machines Corporation of Armonk, N.Y., which is augmented with the mechanisms of the illustrative embodiments described hereafter. The tools (152)-(156), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110). Wherever embodied, the AI tools function to dynamically optimize device operation.

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188), and a server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$)). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
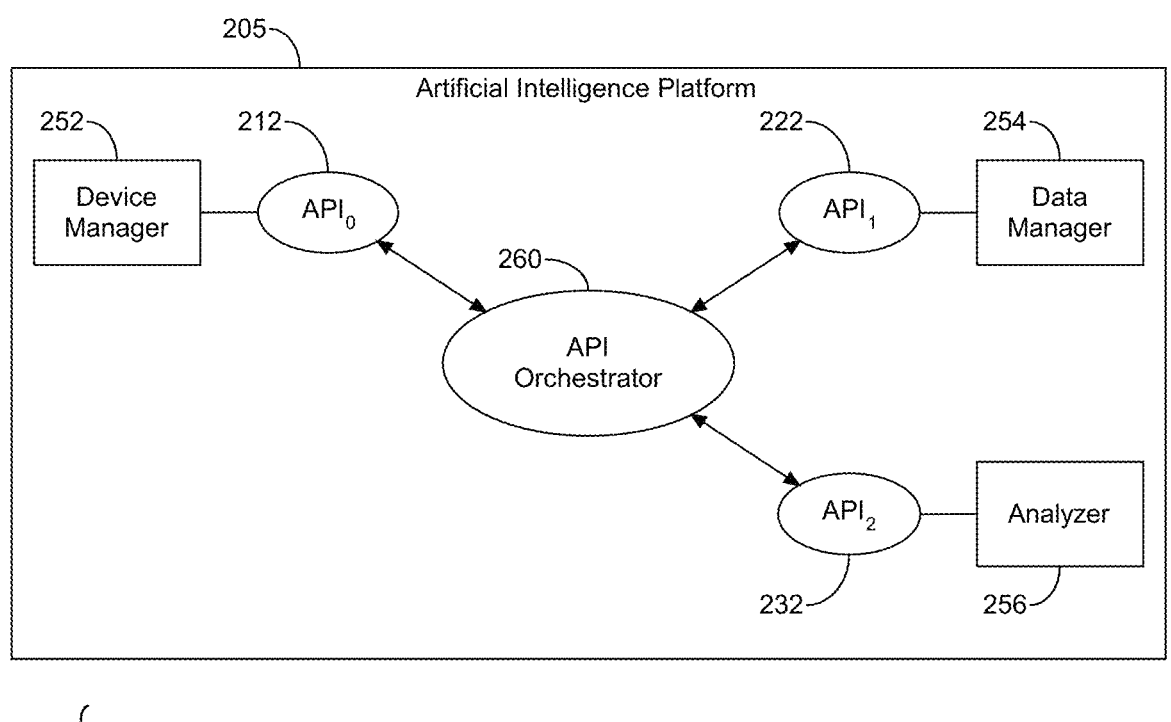
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(156) and their associated functionality. Referring to FIG. 2, a block diagram (200) is provided illustrating the tools (252)-(256) and their associated APIs. As shown, a plurality of tools is embedded within the AI platform (205), with the tools including the device manager (152) shown herein as (252) associated with $API_0$ (212), the data manager (154) shown herein as (254) associated with $API_1$ (222), and the analyzer (156) shown herein as (256) associated with $API_2$ (232). Each of the APIs may be implemented in one or more languages and interface specifications. $API_0$ (212) provides functional support to acquire static and dynamic device data, and to track the dynamic device data; $API_1$ (222) provides functional support for ML and supervised learning for probability assessment corresponding to locale identification and selection; and $API_2$ (232) provides functional support for temporal selection and analysis of data points and measurements. As shown, each of the APIs (212), (222), and (232) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
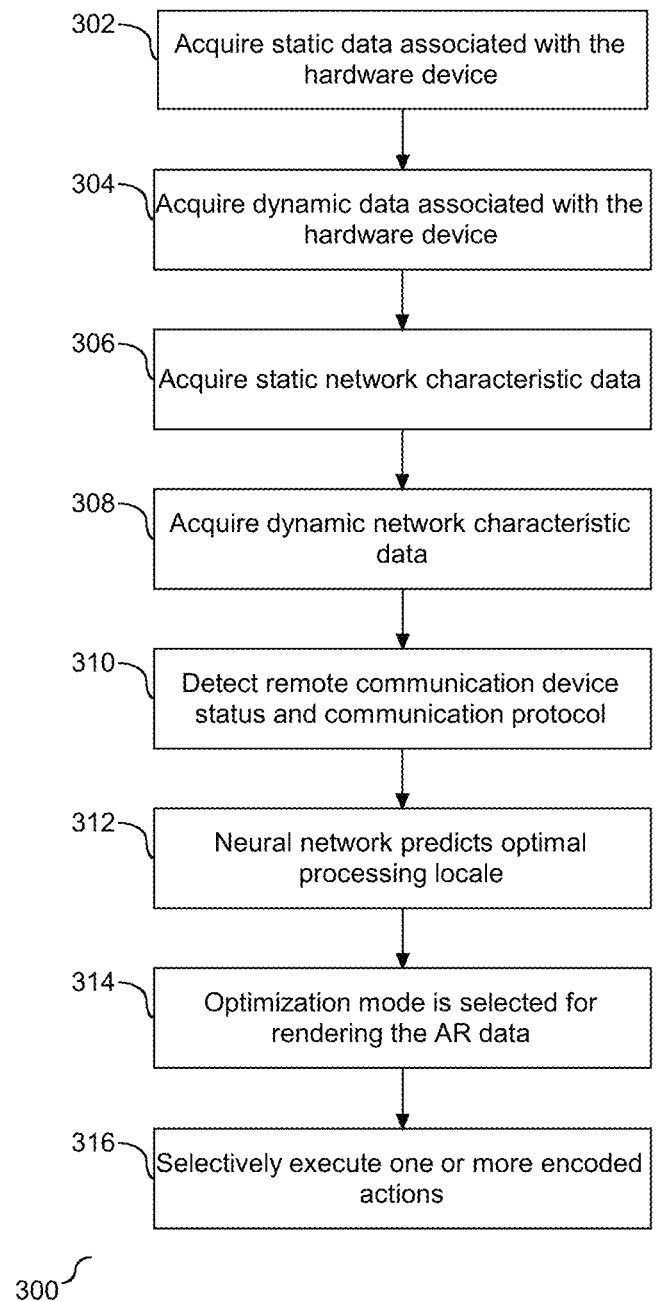
FIG. 3 depicts a flow chart illustrating a process for selecting and implementing an optimization mode to efficiently and effectively render augmented reality data (AR) to a designated hardware device.

Referring to FIG. 3, a flow chart (300) is provided illustrating a process for selecting and implementing an optimization mode and processing locale to efficiently and effectively render augmented reality data (AR). It is understood that all hardware processing devices have limitations based on corresponding device hardware components. However devices that communicate across a communication platform have limitations corresponding to network characteristics. As shown, static data associated with the hardware device that is the subject of the optimization is acquired (302). The subject device may be any form of a processing device. In one embodiment, the subject device is a mobile device, such as a smartphone, or a tablet computer. The subject device includes hardware components, including a central processing unit (CPU), battery, random access memory (RAM), read-only memory (ROM), removable storage, such as a memory card, input components, such as a microphone and a keyboard, and output components, such as a visual display. The static data acquired at step (302) includes various measurements to support the computing aspects of the device. Examples of such measurements include, but are not limited to, the type and generation of the device, an operating system version supporting the device, and any data plan limits corresponding to the network connection.

It is understood that in addition to the static data, the hardware device has associated dynamic data that plays a role in the optimization. As shown, following step (302), dynamic data associated with the hardware device is acquired, or in one embodiment detected through sensors, (304). Examples of the acquired dynamic data include, but are not limited to, network transmission, battery consumption and battery life, data size and data usage, device heat, and device movement. Corresponding sensors may include, but are not limited to, a network sensor, a battery sensor, a thermometer, and an accelerator. Although shown taking place serially, the process of acquiring dynamic data may take place in parallel to the static data acquisition. Network characteristic data is acquired, including static network characteristic data at step (306) and dynamic network characteristic data at step (308). Examples of static network characteristic data include, but are not limited to, data plan limit and wireless connectivity speed limit (e.g., 3G vs 4G). Similarly, examples of dynamic network characteristic data include, but are not limited to, amount of bandwidth available at the time of the AR session, wireless connectivity available (e.g., the regular network speeds may reach 4G but may drop to 3G at times due to network traffic). Accordingly, both static and dynamic data hardware device and network characteristic data are acquired for integration into the device analysis.

Optimization as shown and described herein is bifurcated. One aspect of the optimization is directed at processing locale, and another aspect is directed at device and communication optimization(s). As shown and described in FIG. 1, a neural network is utilized to conduct supervised learning, and more specifically, to conduct an assessment for mode selection, e.g. processing locale. The ML algorithm leverages or generates a classification model, hereinafter referred to as a model, to organize the acquired characteristic data, including static and dynamic data. Output from the ML algorithm dictates a locale for processing, e.g. remote processing or local processing. Transmission of AR and VR formatted communications are limited by device and network capabilities. For example, a device with limited hardware capabilities may not support or enable AR processing and communication, and a device with expanded hardware capabilities may support or enable AR formatted processing and communication. However, even with hardware and network capabilities, enabling AR formatted communication may be restricted in response to dynamic device and network characteristic. Accordingly, the model training as shown and described herein addresses the static and dynamic device and network characteristic data.

Following step (308), the status of the remote communication device and the communication protocol are detected (310). At step (310), the status is ascertained to detect if the remote communication device is available and reachable. For example, if the device has a high load, it may not be able to take on additional processing, and it may be necessary to locate another remote or local processing device. The ML application can weigh in and make such a determination. The device data acquired at steps (302) and (304), the network characteristic data acquired at steps (306) and (308), and the communication protocols detected at step (310) are utilized as input into a corresponding neural model, e.g. NM, to predict an optimal processing locale (312). Although shown and described sequentially, the process of acquiring and inputting the static device and network data into the NM may take place in parallel. The aspect of inputting the acquired device and network static data into the model is directed at training the model. By training the model, e.g. NM, with the static data, the NM becomes proficient at understanding the static device and network characteristic data, and as such, the static limitations that contribute to locale processing decisions. Accordingly, the device and network static characteristic data are used to train the NM.

Output from the NM is in the form of an optimization mode for rendering AR data. The NM may output a single optimization mode, or a plurality of optimization modes available. Following step (312), an optimization mode output from the NM is selected for rendering the AR data (314). Thereafter, one or more encoded actions are selectively executed to render the AR data under the selected optimization mode (316). Accordingly, the NM employs static and dynamic hardware device and network characteristic data to predict an optimal processing locale and to identify or select an optimization mode for rendering the AR data.

Figure 4:
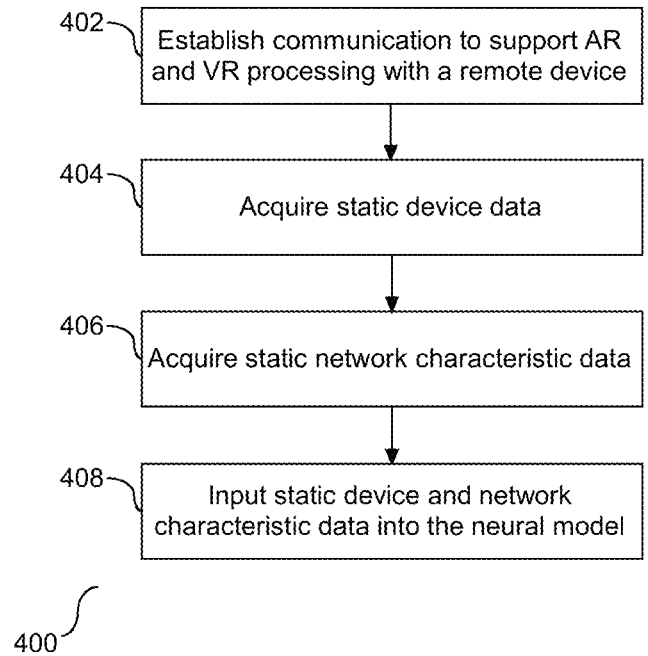
FIG. 4 depicts a flow chart illustrating a process for training a neural model (NM) with static device data and network characteristic data.

Referring to FIG. 4, a flow chart (400) is provided to illustrate a process for training the neural model (NM) with static device and network characteristic data. As shown, communication is established or requested to support AR and VR processing with a remote device (402). Static device data is acquired (404) and static network characteristic data is acquired (406). The static data acquired at step (404) includes various measurements to support the computing aspects of the device. Examples of such measurements include, but are not limited to, the type and generation of the device, an operating system version supporting the device, and any data plan limits corresponding to the network connection. Similarly, examples of static network characteristic data include, but are not limited to, data plan limit, wireless connectivity speed limit (e.g., 3G vs 4G). The data acquired at step (404) and (406) are utilized as input into the corresponding neural model, e.g. NM, (408) to continue training the NM.

Figure 5:
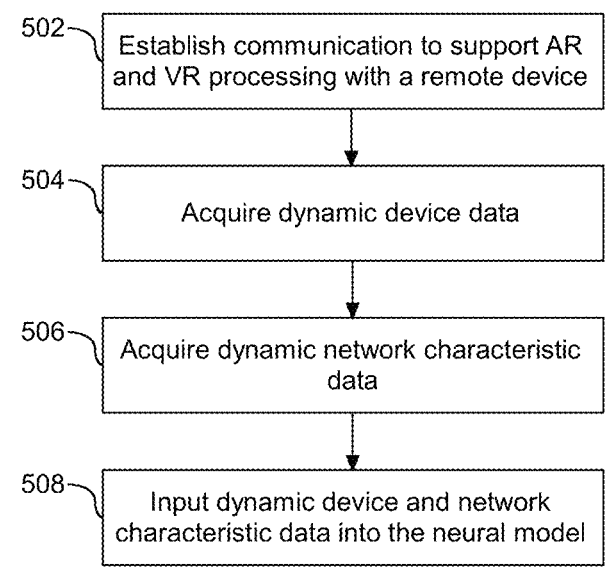
FIG. 5 depicts a flow chart illustrating a process for training the NM with dynamic device data and network characteristic data.

Referring to FIG. 5, a flow chart (500) is provided to illustrate a process for training the neural model (NM) with dynamic device and network characteristic data. As shown, communication is established or requested to support AR and VR processing with a remote device (502). Dynamic device data is acquired (504) and dynamic network characteristic data is acquired (506). The dynamic device data acquired at step (504) includes various measurements to support the computing aspects of the device. Examples of such measurements include, but are not limited to, network transmission, battery consumption and battery life, data size and data usage, device heat, and device movement. Similarly, examples of dynamic network characteristic data include, but are not limited to, amount of bandwidth available at the time of the AR session, wireless connectivity available (e.g., the regular network speeds may reach 4G but may drop to 3G at times due to network traffic). The data acquired at step (504) and (506) are utilized as input into the corresponding neural model, e.g. NM, (508) to continue training the NM.

Although the acquisition of static data and dynamic data shown in FIGS. 4 and 5, respectively, are shown and described sequentially, the process of acquiring and inputting the static and dynamic device and network data into the NM may take place in parallel. The aspect of inputting the acquired device and network dynamic data into the model is directed at continued training the model. By training the model, e.g. NM, with the dynamic data, the NM become proficient at understanding the dynamic device and network characteristic data, and as such, the dynamic limitations that contribute to locale processing decisions. Accordingly, the device and network dynamic characteristic data are used to continue training the NM.

Dynamic device and network characteristic data are by their very nature subject to change. However, patterns may be present or detectable within the characteristic data, and such patterns are learned by the NM. For example, network bandwidth may be limited by the time of day, e.g. limited bandwidth available during peak hours and greater bandwidth available during non-peak hours. Similarly, device battery power may be greater at select hours, and limited during other hours, e.g. fully charged at the beginning of the day and limited charge remaining at the end of the day. Such patterns are learned and leveraged by the model for optimization and designation of a processing locale.

Figure 6:
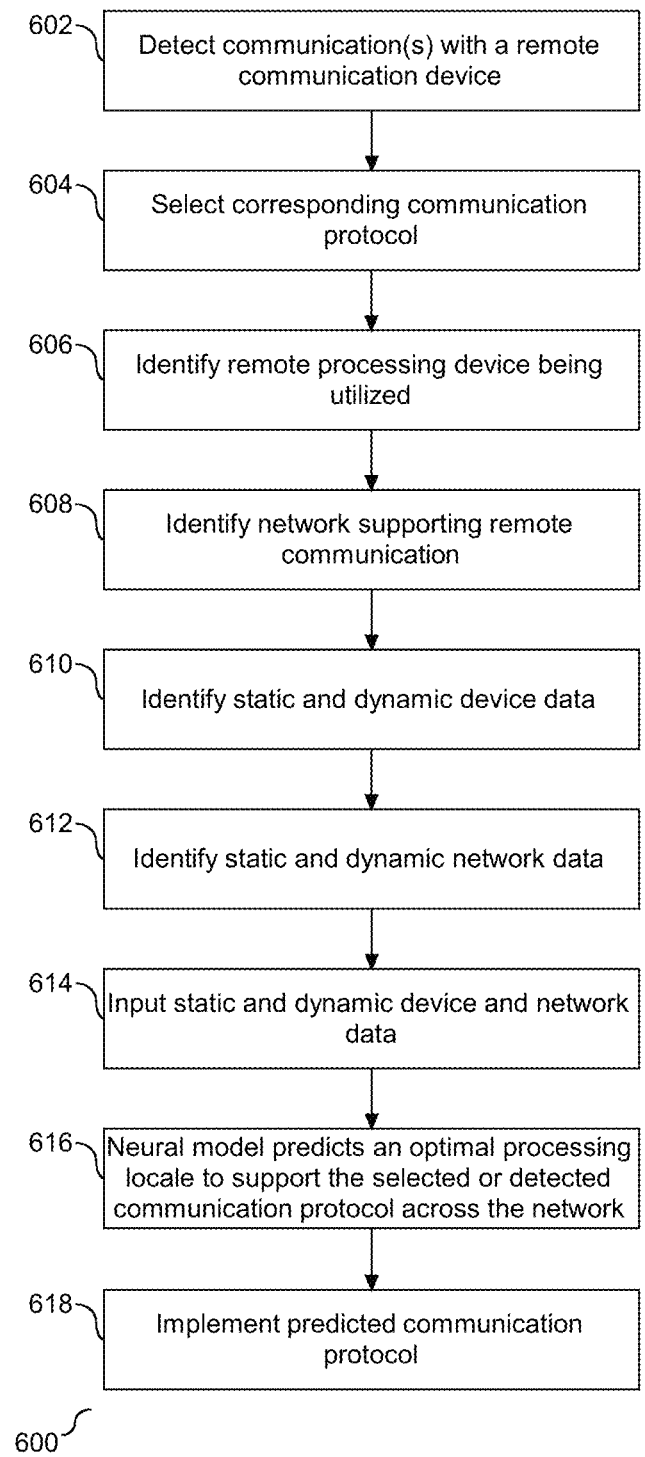
FIG. 6 depicts a flow chart illustrating a process for leveraging the trained NM to designate a processing locale.

Referring to FIG. 6, a flow chart (600) is provided to illustrate a process for leveraging the trained NM to designate a processing locale. As shown, communication(s) is detected or received with a remote communication device (602), and a corresponding communication protocol is selected (604). Communication protocol includes voice, image data, video data, VR, and AR. It is understood that in one embodiment, the communication may support two or more protocols. Similarly, in one embodiment, the AI platform (150) supports and enables natural language processing (NLP) to evaluate one or more initial communications to detect a desired protocol. The remote processing device being utilized in the communication is identified (606), and the network supporting remote communication with the remote processing device is identified (608). Both static and dynamic device data and network data are identified at (610) and (612), respectively. Thereafter, the static and dynamic device and network data are input into the neural model, e.g. NM, (614). Output from the NM is in the form of a predicted optimal processing locale to support a selected or detected communication protocol across the network (616). Following step (616), the predicted or selected communication protocol by the NM is implemented (620). In one embodiment, the predicted or selected communication protocol is in the form of remote processing or local processing. The prediction is based on learned device and network limitations and patterns. Accordingly, the trained NM is employed to predict and select a processing locale category and location to support remote processing and communication.

Figure 7:
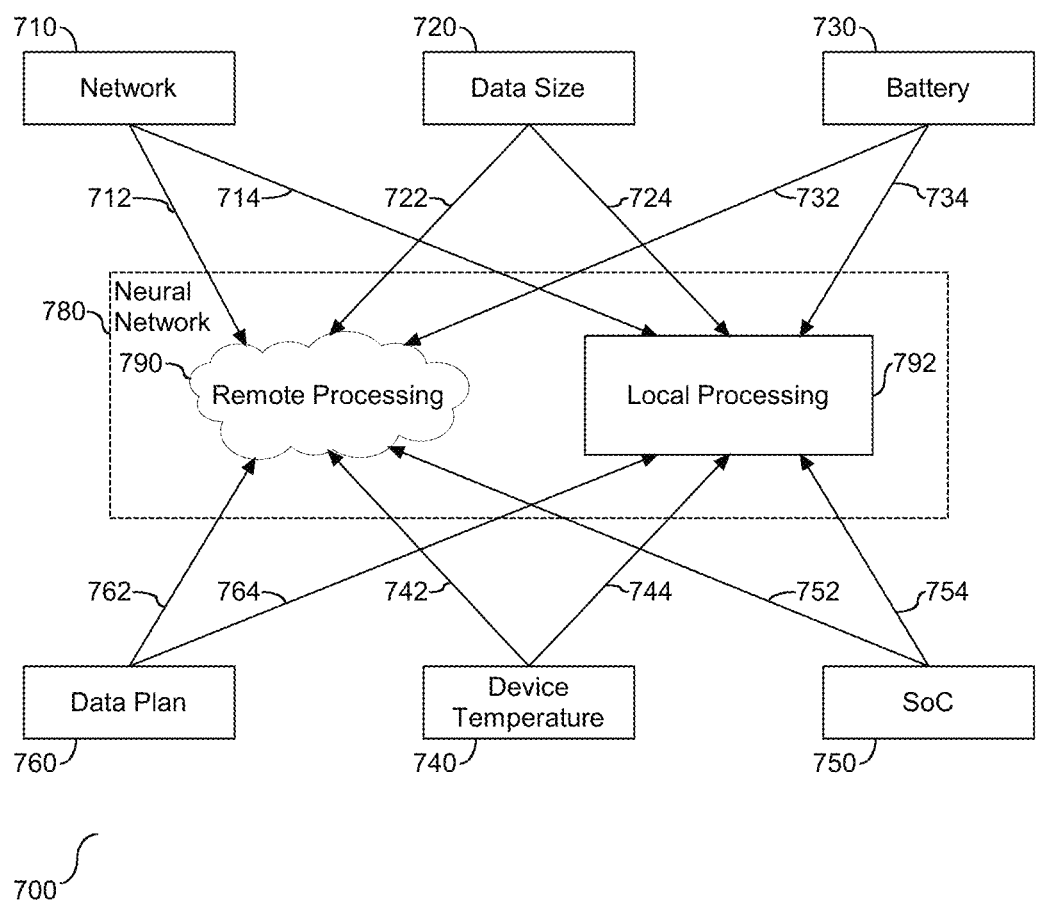
FIG. 7 depicts a diagram illustrating an example optimization flow supporting the NM and selection of a processing locale.

Referring to FIG. 7, a diagram (700) is provided to illustrate an example optimization flow supporting the neural network and selection of a processing locale. As shown, both static and dynamic device and network characteristic data are operatively coupled to the neural network (780). Static device data (750), shown herein by example as a type of processor, is directed at device hardware components. Device capability data is communicated to the neural network (780), including limited processing capability (752) and non-limited processing capability (754). As shown, limited processing capability is directed to remote processing (790), and non-limited processing capability is directed to local processing (792). The limited and non-limited processing capabilities shown herein are for illustrative purposes. In one embodiment, the processing capabilities may be expanded. Another example of static data is shown at (760) and directed at a corresponding data plan. It is understood that communication devices, such as smartphones, have a corresponding data plan that dictates or limits transmission of data across the network. A device with an unlimited data plan or a relatively high data plan (762) is directed to remote processing (790) and a device with a limited data plan (764) is directed to local processing (792). In one embodiment, the data usage for a defined period is a dynamic characteristic may be utilized by the neural network (780) as a factor in the locale processing. Accordingly, device hardware capability and data plan usage are factors that contribute to the locale assessment and selection by the MLM.

Other factors that contribute to the locale assessment and selection are shown herein by examples as the network supporting communication(s) (710), data size (720), battery (730), and device temperature (740). The network (710) is shown with high bandwidth (712) directed at remote processing (790) and low bandwidth (714) directed at local processing (792). The data size (720) is shown with low data size (722) directed at remote processing (790) and high data size (724) directed at local processing (792). The battery (730), e.g. battery usage, is shown with high usage (732) directed at remote processing (790) and low usage (734) directed at local processing (792). The device heating (740), which may be related to battery usage, is shown with high heat byproduct (742) directed at remote processing (790) and low heat byproduct (744) directed at local processing (792). Device and network characteristic data for each of the contributing device and network elements (710)-(760) are shown operatively coupled to the neural model (780) for selection or identification of a processing locale, (790) or (792). Accordingly, the optimization flow shown herein illustrates the flow of characteristic data to the neural model, and output from the neural model to dictate selection of a processing locale to support AR or VR communication platforms.

Figure 8:
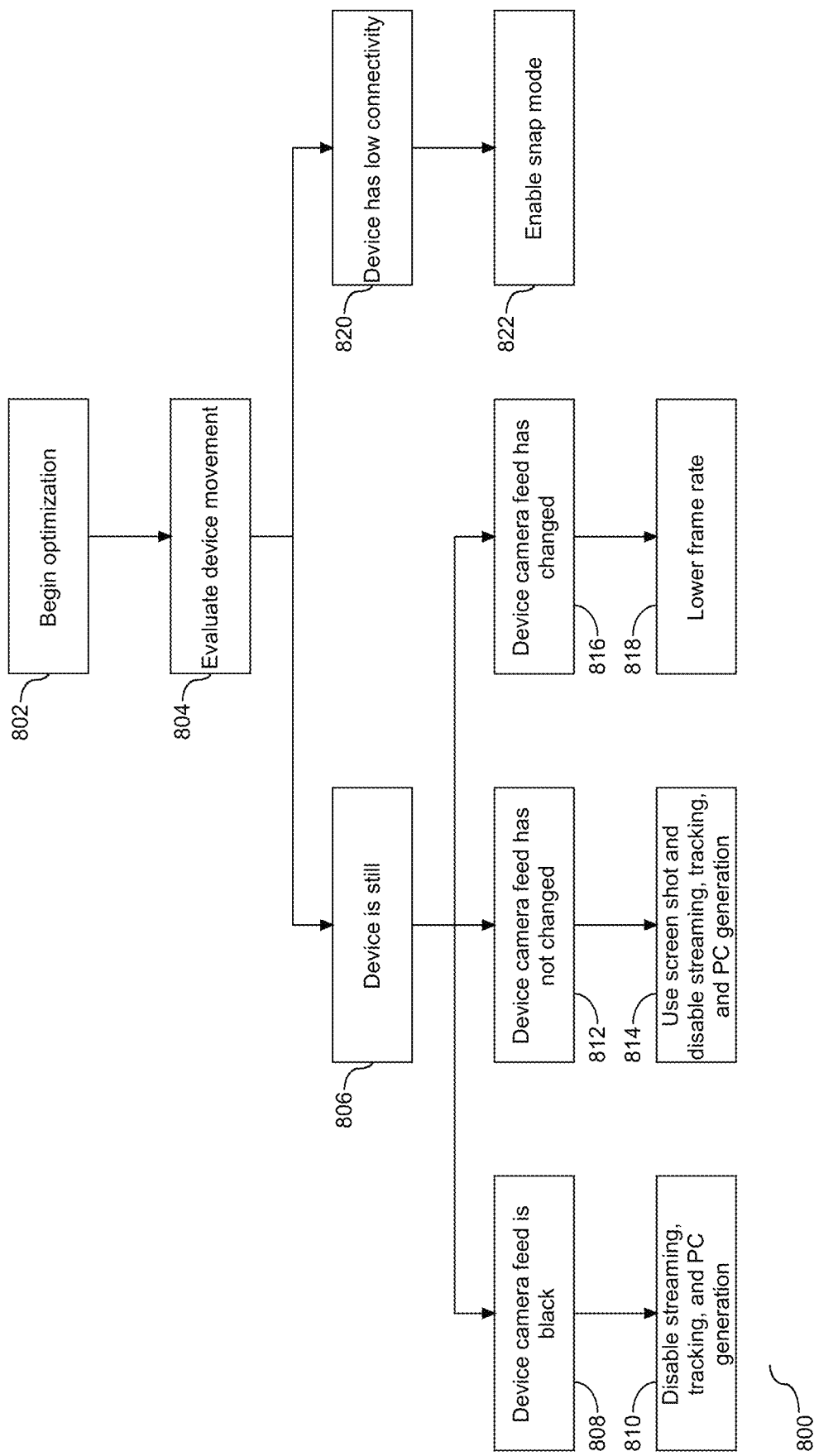
FIG. 8 depicts a flow diagram illustrating a usecase for implementation of a stillness check for a device supporting communication and transmission of data.

Referring to FIG. 8, a flow diagram (800) is provided to illustrate a usecase for implementation of a stillness check for a device supporting communication and transmission of data. As shown, optimization is initiated (802) and movement of the device is evaluated (804). In one embodiment, an accelerometer is utilized to detect and quantify device movement. In the example shown herein, the device is detected as being still, e.g. stationary, (806). Stillness may be detected for various reasons, and further assessment is conducted with respect to data streaming in support of AR and VR communication. As shown, a corresponding camera feed is assessed in view of the stationary assessment of the device. If the camera feed is black (808), the data streaming is de-activated (810), if the camera feed has not changed (812), then a screenshot is utilized and data streaming is de-activated (814), or if the camera feed has changed (816), e.g. movement has been detected by the camera, then the frame rate of the data streaming is lowered (818). Accordingly, as demonstrated in this example, an operating mode of the camera is optimized based on the stationary reading of the device and corresponding data ascertained from the camera feed.

The usecase shown and described in FIG. 8 is one example of optimization. In another embodiment, device connectivity is evaluated so that an appropriate optimization may be conducted. For example, if a low connectivity is detected (820), e.g. the data transfer speed is low, then an optimization technique is employed to enable a snap mode to send images and to de-activate transmission of video (822). Accordingly, different optimizations may be entailed with respect to the physical communication device.

Other usecase include, but are not limited to frame rate optimization, not shipping a point cloud, snap mode, image annotation, and monitoring bandwidth, battery, and device capabilities. With respect to frame rate optimization, a subset of pixels in a given frame can be analyzed to determine if the frame has changed from a prior frame, or if the frame display is empty, e.g. black screen. By analyzing every nth pixel in a given frame, a percentage of the pixels are analyzed, and the stream is optimized by changing the frame rate, or in one embodiment disabling the stream. Camera pose information can also be leverage to entirely stop the computations if the phone movement leads to a negligible scene change. This optimization ensures that the data plan is not consumed and AR computations are not performed unnecessarily, which reduces device heat and battery drainage.

With respect to the point cloud optimization, during a remote assist session, the field technician or a remote expert can drop annotations into an AR scene. Instead of shipping the entire point cloud between two devices, the remote device, e.g. the field technician's device, can be set to function as a primary device and the expert device can be set as a secondary device, with only the camera frame shipped from the primary device including annotations. Tracking is frozen on both devices to enable the annotations. When the expert technician places annotations in the scene, the coordinate position of the annotation is set to the primary device, and the coordinate position is used to simulate an actuation on the primary device to perform ray casting against the point cloud, thereby calculating a three dimensional location of the annotation. Once the annotation appears in the AR scene, it is visible on both devices without the expense of maintaining two copies of the point cloud. This optimization ensures that the data plan is not unnecessarily consumed by shipping the point cloud and eliminates syncing issues between two devices.

With respect to the snap mode optimization, where network connectivity is low, an image exchange mode is activated. In snap mode, the primary device does not stream to the secondary device. Instead, the primary device freezes tracking, takes a picture, and sends the image to the secondary device. The recipient of the image can annotate the image and transmit the position of the annotation. This optimization ensures that the data plan is not unnecessarily consumed and that the AR application runs in low connectivity environments.

Another usecase is directed at sending annotations only, instead of annotated images. If the primary device is classified as low end and cannot support three dimensional rendering, a two dimensional mode is activated. In this mode, images are shipped from the primary device to the secondary device for annotation. Once annotated, the position information along with relevant annotation data is transmitted to the primary device, which is then displayed on the primary device over the image taken on the primary device. This optimization saves significant data transfer as sending position information with the annotations requires less bandwidth than the image data.

Other usecases are directed at monitoring bandwidth, battery, and device capabilities. The quality of the mobile device connection, battery, or capabilities is monitored and the device is optimized responsive to the monitoring. For example, old devices are set to render two dimensional data instead of three dimensional data, as three dimensional data is computationally expensive and requires more hardware. With respect to battery power, while on low battery power snap mode can reduce power consumption. Similarly, during low connectivity, the snap mode can provide communication of data without video streaming. Accordingly, the usecases shown and described herein are examples to support the multi-dimensional aspect of device optimization and locale processing.

Figure 9:
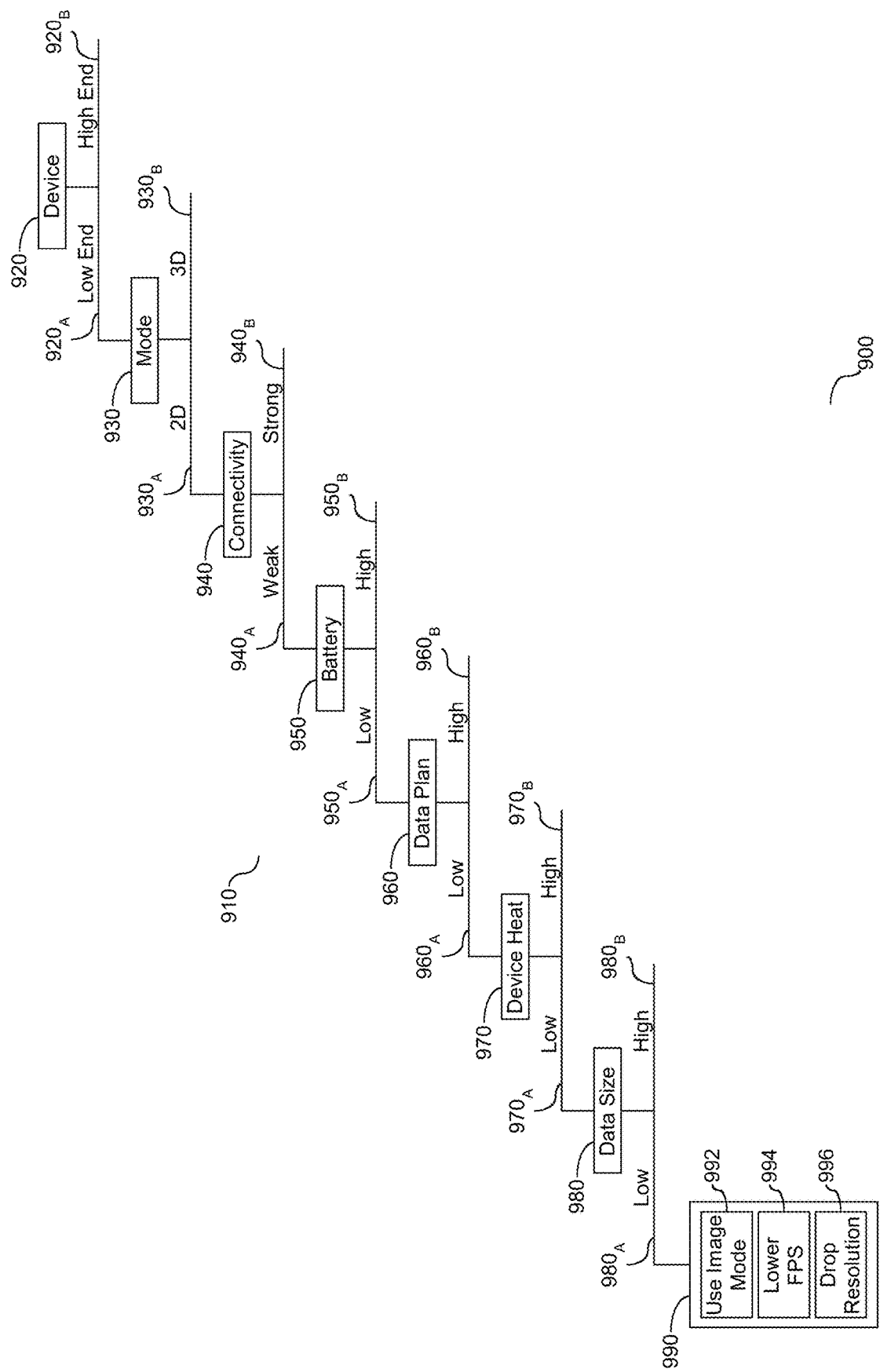
FIG. 9 depicts a block diagram illustrating the use of a decision tree to support and direct device optimization.

Referring to FIG. 9, a block diagram (900) is provided to illustrate use of a decision tree (910) to support and direct device optimization. The decision tree (910) is shown herein as a hierarchal arrangement of device settings and components. The hierarchy is shown herein with layers directed to a list of device optimizations. The root node (920) of the decision tree is identified a physical communication device that is the subject of the optimization. In one embodiment, the device is a smartphone employed by a technician at a remote location. The device is categorized based on processing power as a high end device ($920_B$) or a low end device ($920_A$). In one embodiment, a relatively new device model may be classified as high end, and a relatively older model may be classified as low end, but that classification should not be considered limiting. As shown in this example, the device is classified or designated as low end ($920_A$).

The first tier, $Tier_1$ (930), of the hierarchy is directed at the mode of the physical device. The mode is directed on the data point requested. An AR data point ($930_B$) is represented in three dimensional space and a VR data point ($930_A$) is represented in two dimensional space, and as such, the VR data point utilizes less processing power than the AR data point. In this example shown herein, the data point is detected or defined as the VR data point, and the mode is set to the two dimensional data point ($930_A$). The second tier, $Tier_2$ (940), of the hierarchy is directed to connectivity to a network communication medium. It is understood that connectivity may be based on characteristics of the network, the device, location of the device, etc. In the example shown herein, the connectivity options are weak ($940_A$) and strong ($940_B$). It is understood that the connectivity is dynamic. A strong connectivity signal may vary and become weak, and a weak connectivity signal may become strong. In the example shown herein, the connectivity is defined as weak ($940_A$). The third tier, $Tier_3$ (950), of the hierarchy is directed at the device battery and pertains to the charge remaining in the battery at the defined temporal setting, and in one embodiment reflects the rate of discharge of power. It is understood in the art that the battery reading is dynamic. In the example shown herein, the battery reading options are low ($950_A$) and high ($950_B$), and the battery setting is defined as low ($950_A$). The fourth tier, $Tier_4$ (960), of the hierarchy is directed at the data plan, and reflects a fixed quantity of data to be consumed in view of limitations defined in a corresponding data plan. It is understood that most data plans define a finite quantity of data for communication across the network for a set time period, e.g. monthly. In one embodiment, the data plan is a static value. As shown in this example, the data plan variables include low ($960_A$) and high ($960_B$), and the data plan setting is low ($960_A$). The fifth tier, $Tier_5$ (970), of the hierarchy is directed at device heat, and reflects a heat by-product measurement of the device. It is understood in the art that this measurement is dynamic, and different processors have different throttling temperatures. In this example, the heat setting options are low ($970_A$) and high ($970_B$), and the heat setting is detected as low ($970_A$). The sixth tier, $Tier_6$ (980), of the hierarchy is directed at the data size for data to be communicated across a corresponding network. It is understood in the art that this measurement is dynamic, and different data have different sizes. In this example, the data settings are low ($980_A$) and high ($980_B$), and the data setting is detected as low ($980_A$). Accordingly, the tiers (930)-(980) represent the hierarchical layers of the decision tree.

The decision tree (910) is operatively coupled to a list of optimizations (990). The output from the hierarchy directs optimization for communication of data with a computing device across a corresponding network. In the example shown herein, the optimization is based on a low end device, two dimensional data, weak connectivity, low battery, low data plan, low device heat, and a low data size. The optimization indicates use of an image mode (992), a lower frame per second (FPS) setting (994) and a resolution drop (996). In one embodiment, the image mode (992) correlates to the designation of a low end device ($920_B$), the FPS setting (994) correlates to a low data plan setting ($960_A$), and the resolution drop (996) correlates to the low data plan setting ($960_A$). Accordingly, the decision tree and corresponding device settings illustrates an example tool and corresponding algorithm to optimize device settings.

Figure 10:
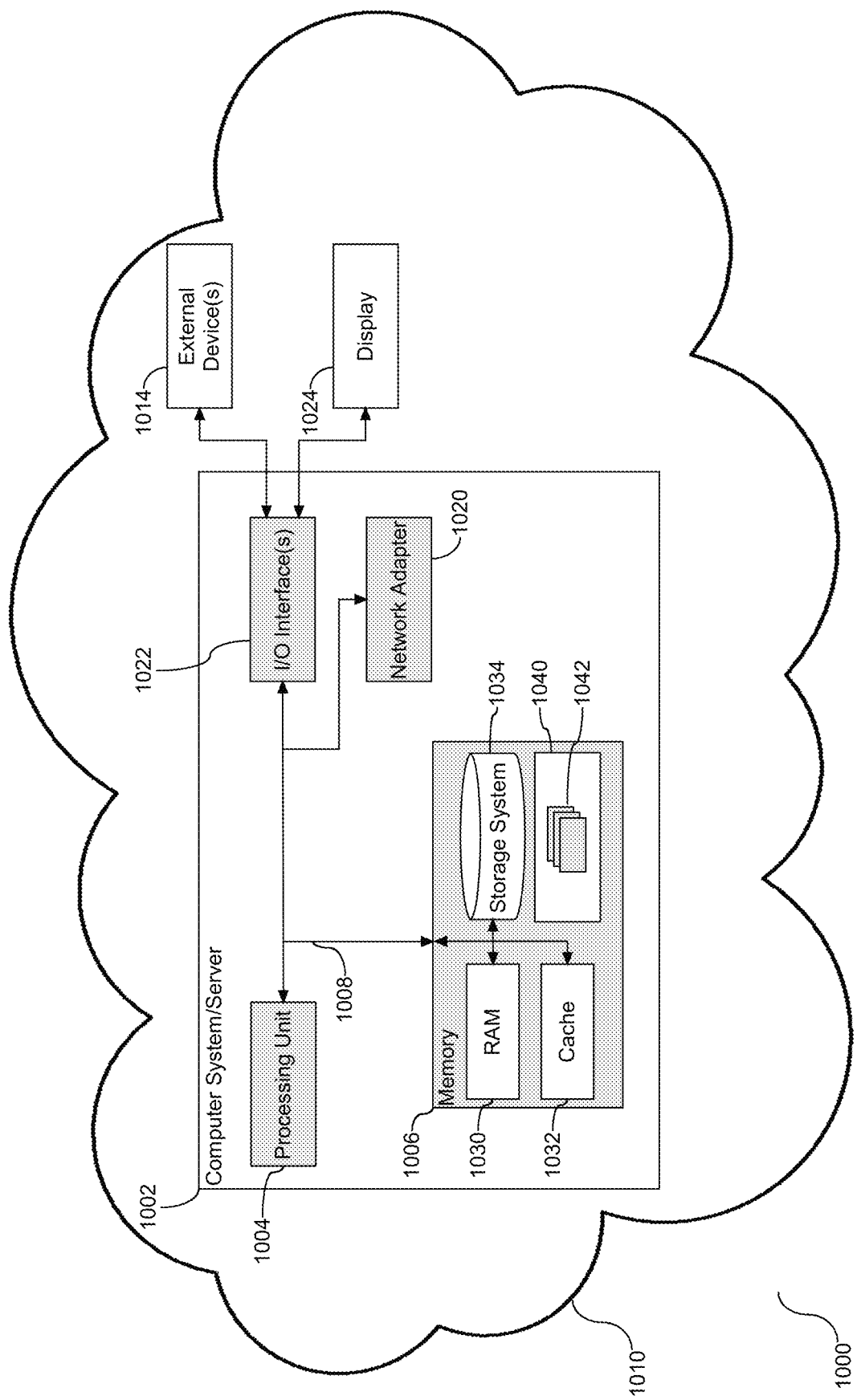
FIG. 10 depicts a block diagram illustrating an example of a computer system/server of a cloud based support system, to implement the system and processes described above with respect to FIGS. 1-9.

Embodiments shown and described herein may be in the form of a computer system for use with an intelligent computer platform for providing orchestration of activities across one or more domains to minimize risk. Aspects of the tools (152)-(156) and their associated functionality may be embodied in a computer system/server in a single location, or in one embodiment, may be configured in a cloud based system sharing computing resources. With reference to FIG. 10, a block diagram (1000) is provided illustrating an example of a computer system/server (1002), hereinafter referred to as a host (1002) in a cloud computing environment (1010), to implement the system, tools, and processes described above with respect to FIGS. 1-9. Host (1002) is operational with numerous other general purpose or special purpose computing system environments or configurations. Examples of well-known computing systems, environments, and/or configurations that may be suitable for use with host (1002) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1002) may be described in the general context of computer system-executable instructions, such as program modules, being executed by a computer system. Generally, program modules may include routines, programs, objects, components, logic, data structures, and so on that perform particular tasks or implement particular abstract data types. Host (1002) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, host (1002) is shown in the form of a general-purpose computing device. The components of host (1002) may include, but are not limited to, one or more processors or processing units (1004), e.g. hardware processors, a system memory (1006), and a bus (1008) that couples various system components including system memory (1006) to processor (1004). Bus (1008) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1002) typically includes a variety of computer system readable media. Such media may be any available media that is accessible by host (1002) and it includes both volatile and non-volatile media, removable and non-removable media.

Memory (1006) can include computer system readable media in the form of volatile memory, such as random access memory (RAM) (1030) and/or cache memory (1032). By way of example only, storage system (1034) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1008) by one or more data media interfaces.

Program/utility (1040), having a set (at least one) of program modules (1042), may be stored in memory (1006) by way of example, and not limitation, as well as an operating system, one or more application programs, other program modules, and program data. Each of the operating systems, one or more application programs, other program modules, and program data or some combination thereof, may include an implementation of a networking environment. Program modules (1042) generally carry out the functions and/or methodologies of embodiments to dynamically orchestrate of activities across one or more domains to minimize risk. For example, the set of program modules (1042) may include the tools (152)-(156) as described in FIG. 1.

Host (1002) may also communicate with one or more external devices (1014), such as a keyboard, a pointing device, etc.; a display (1024); one or more devices that enable a user to interact with host (1002); and/or any devices (e.g., network card, modem, etc.) that enable host (1002) to communicate with one or more other computing devices. Such communication can occur via Input/Output (I/O) interface(s) (1022). Still yet, host (1002) can communicate with one or more networks such as a local area network (LAN), a general wide area network (WAN), and/or a public network (e.g., the Internet) via network adapter (1020). As depicted, network adapter (1020) communicates with the other components of host (1002) via bus (1008). In one embodiment, a plurality of nodes of a distributed file system (not shown) is in communication with the host (1002) via the I/O interface (1022) or via the network adapter (1020). It should be understood that although not shown, other hardware and/or software components could be used in conjunction with host (1002). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1006), including RAM (1030), cache (1032), and storage system (1034), such as a removable storage drive and a hard disk installed in a hard disk drive.

Computer programs (also called computer control logic) are stored in memory (1006). Computer programs may also be received via a communication interface, such as network adapter (1020). Such computer programs, when run, enable the computer system to perform the features of the present embodiments as discussed herein. In particular, the computer programs, when run, enable the processing unit (1004) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (1002) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
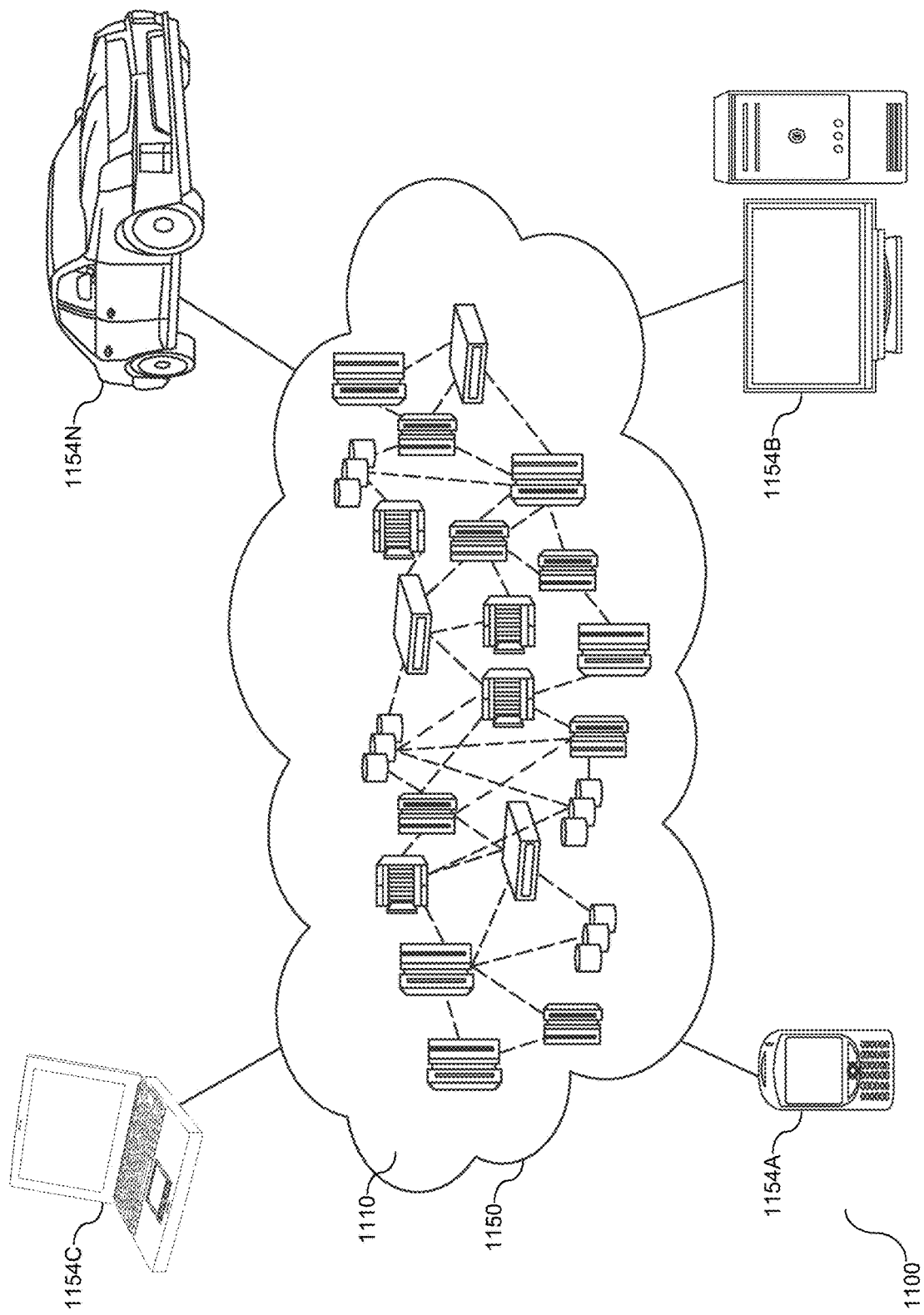
FIG. 11 depicts a block diagram illustrating a cloud computer environment.

Referring now to FIG. 11, an illustrative cloud computing network (1100). As shown, cloud computing network (1000) includes a cloud computing environment (1150) having one or more cloud computing nodes (1110) with which local computing devices used by cloud consumers may communicate. Examples of these local computing devices include, but are not limited to, personal digital assistant (PDA) or cellular telephone (1154A), desktop computer (1154B), laptop computer (1154C), and/or automobile computer system (1154N). Individual nodes within nodes (1110) may further communicate with one another. They may be grouped (not shown) physically or virtually, in one or more networks, such as Private, Community, Public, or Hybrid clouds as described hereinabove, or a combination thereof. This allows cloud computing environment (1100) to offer infrastructure, platforms and/or software as services for which a cloud consumer does not need to maintain resources on a local computing device. It is understood that the types of computing devices (1154A-N) shown in FIG. 11 are intended to be illustrative only and that the cloud computing environment (1150) can communicate with any type of computerized device over any type of network and/or network addressable connection (e.g., using a web browser).

Figure 12:
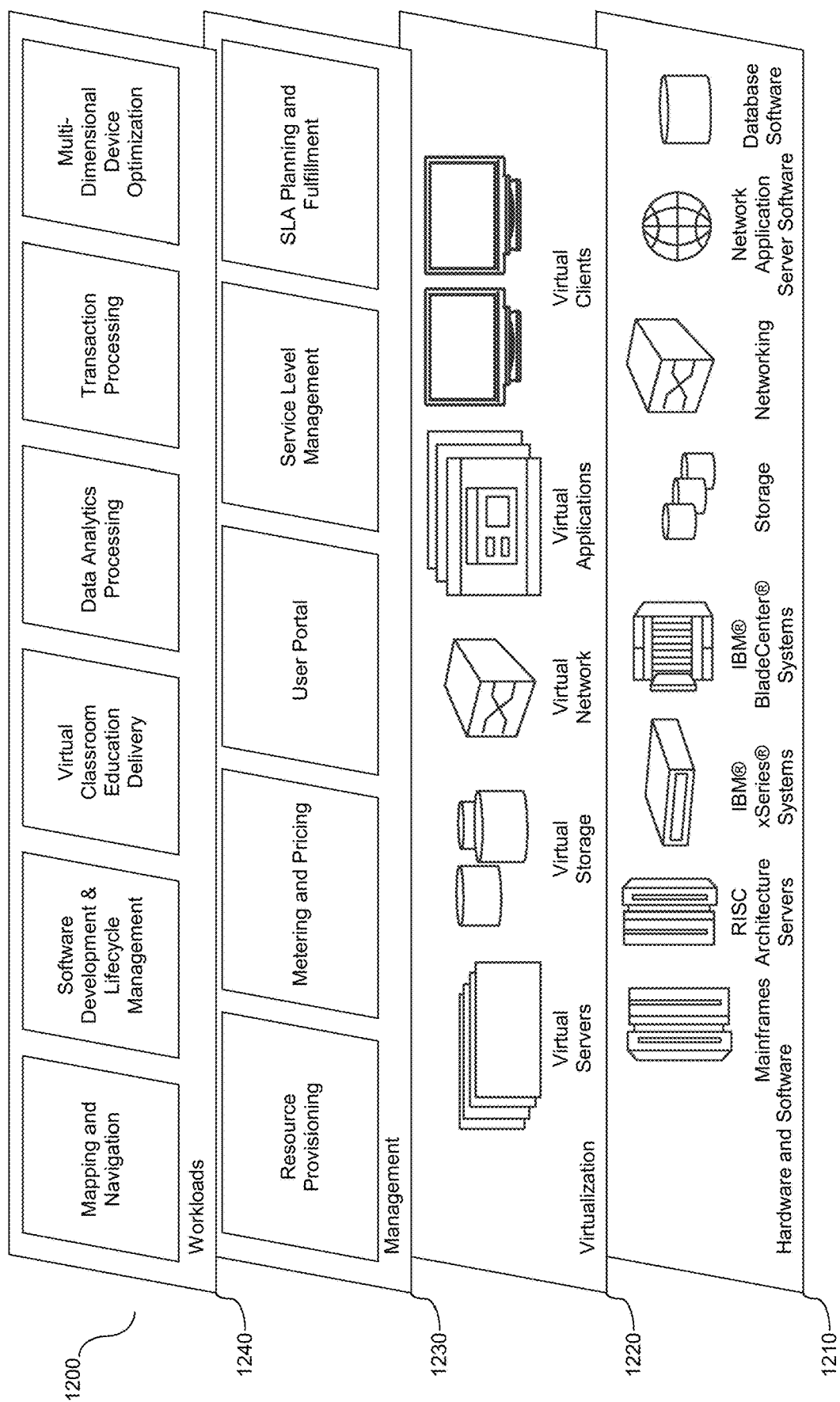
FIG. 12 depicts a block diagram illustrating a set of functional abstraction model layers provided by the cloud computing environment.

Referring now to FIG. 12, a set of functional abstraction layers (1200) provided by the cloud computing network of FIG. 11 is shown. It should be understood in advance that the components, layers, and functions shown in FIG. 12 are intended to be illustrative only, and the embodiments are not limited thereto. As depicted, the following layers and corresponding functions are provided: hardware and software layer (1210), virtualization layer (1220), management layer (1230), and workload layer (1240).

The hardware and software layer (1210) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1220) provides an abstraction layer from which the following examples of virtual entities may be provided: virtual servers; virtual storage; virtual networks, including virtual private networks; virtual applications and operating systems; and virtual clients.

In one example, management layer (1230) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1240) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and multi-dimensional device optimization.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an artificial intelligence platform to resolve orchestration of travel activities and meeting scheduling.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The embodiments shown and described herein are directed to collaborative mobile AR applications. In one embodiment, the collaborative model may be expanded to VR applications. Accordingly, the scope of protection of the embodiments is limited only by the following claims and their equivalents.

What is claimed is:

1. A computer system comprising:
a processing unit operatively coupled to memory; and
an artificial intelligence (AI) platform, in communication with the processing unit, having tools to optimize device operation, the tools comprising:
a device manager configured to acquire static hardware device data and track dynamic hardware characteristic data over one or more temporal segments;
a data manager, operatively coupled to the device manager, configured to train a neural model (NM) with corresponding device and network data, including input the acquired static hardware device data and the tracked dynamic hardware characteristic data into the NM, and leverage the NM to identify locale processing patterns corresponding to the inputted data;
an analyzer, operatively coupled to the data manager, configured to temporally analyze one or more data points and corresponding measurements of the tracked dynamic hardware characteristic data;
the data manager configured to leverage the NM to identify a processing locale corresponding to the temporal analysis, and to return the identified processing locale as output data;
the device manager configured to selectively implement one or more encoded actions in compliance with the identified processing locale;
the analyzer configured to create a directed graph (DG) and populate one or more nodes of the DG with the static hardware device data and the tracked dynamic hardware characteristic data; and
the analyzer configured to dynamically assign a weight to one or more edges connecting the nodes in the created DG, the weight assignment corresponding to updated static and dynamic device and network data, and update the DG responsive to the dynamic weight assignment,
wherein the dynamic weight assignment reflects implementation of one or more identified device operation optimizations.

2. The computer system of claim 1, wherein the device manager is further configured to identify the one or more device operation optimizations, wherein the one or more device operation optimizations correspond to the temporal analysis, and wherein the device manager configured to selectively implement one or more encoded actions comprises the device manager configured to selectively implement the one or more of the identified device operation optimizations.

3. The computer system of claim 2, wherein the identified processing locale and the selectively implemented one or more identified device operation optimizations enable communication of data in an augmented reality (AR) format and/or a virtual reality (VR) format.

4. The computer system of claim 2, wherein the one or more device operation optimizations comprise use image mode, frame per second (FSP) rate, resolution, or a combination thereof.

5. A computer program product to support and enable multi-dimensional device operation optimization, the computer program product comprising:
a computer readable storage medium having program code embodied therewith, the program code executable by a processor to:
acquire static hardware device data and track dynamic hardware characteristic data over one or more temporal segments;
train a machine neural model (NM) with corresponding device and network data, including input the acquired static hardware device data and the tracked dynamic hardware characteristic data into the NM;
leverage the NM to identify locale processing patterns corresponding to the inputted data;
temporally analyze one or more data points and corresponding measurements of the tracked dynamic hardware characteristic data;
leverage the NM to identify a processing locale corresponding to the temporal analysis, and return the identified processing locale;

selectively implement one or more encoded actions in compliance with the identified processing locale;

create a directed graph (DG) and populate one or more nodes of the DG with the static hardware device data and the tracked dynamic hardware characteristic data; and dynamically assign a weight to one or more edges connecting the nodes in the created DG, the weight assignment corresponding to updated static and dynamic device and network data, and update the DG responsive to the dynamic weight assignment, wherein the dynamic weight assignment reflects implementation of one or more identified device operation optimizations.

6. The computer program product of claim 5, further comprising program code executable by the processor to identify the one or more device operation optimizations, wherein the one or more device operation optimizations correspond to the temporal analysis, wherein the program code executable by the processor to selectively implement one or more encoded actions comprises program code executable by the processor to selectively implement the one or more of the identified device operation optimizations.

7. The computer program product of claim 6, wherein the identified processing locale and the selectively implemented one or more identified device operation optimizations enable communication of data in an augmented reality (AR) format and/or a virtual reality (VR) format.

8. The computer program product of claim 6, wherein the one or more device operation optimizations comprise use image mode, frame per second (FSP) rate, resolution, or a combination thereof.

9. A computer implemented method, comprising:

acquiring static hardware device data and tracking dynamic hardware characteristic data over one or more temporal segments;

training a neural model (NM) with corresponding device and network data, including inputting the acquired static hardware device data and the tracked dynamic hardware characteristic data into the NM;

leveraging the NM to identify locale processing patterns corresponding to the inputted data;

temporally analyzing one or more data points and corresponding measurements of the tracked dynamic hardware characteristic data;

leveraging the NM to identify a processing locale corresponding to the temporal analysis, and returning the identified processing locale;

selectively implementing one or more encoded actions in compliance with the identified processing locale;

creating a directed graph (DG) and populating one or more nodes of the DG with the static hardware device data and the tracked dynamic hardware characteristic data; and dynamically assigning a weight to one or more edges connecting the nodes in the created DG, the weight assignment corresponding to updated static and dynamic device and network data, and updating the DG responsive to the dynamic weight assignment, wherein the dynamic weight assignment reflects implementation of one or more identified device operation optimizations.

10. The computer implemented method of claim 9, further comprising identifying the one or more device operation optimizations corresponding to the temporal analysis, wherein the selectively implementing one or more encoded actions comprises selectively implementing the one or more of the identified device operation optimizations.

11. The computer implemented method of claim 10, wherein the identified processing locale and the selectively implemented one or more identified device operation optimizations enable communication of data in an augmented reality (AR) format and/or a virtual reality (VR) format.

12. The computer implemented method of claim 10, wherein the one or more device operation optimizations comprise use image mode, frame per second (FSP) rate, resolution, or a combination thereof.

\* \* \* \* \*